(12) United States Patent
Yasuda et al.

(10) Patent No.: US 8,797,171 B2
(45) Date of Patent: Aug. 5, 2014

(54) DELAYED POWER-ON FUNCTION FOR AN ELECTRONIC DEVICE

(75) Inventors: Tomoaki Yasuda, Daito (JP); Yasuhisa Tsubokawa, Daito (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 13/610,700

(22) Filed: Sep. 11, 2012

(65) Prior Publication Data

US 2013/0063271 A1  Mar. 14, 2013

Related U.S. Application Data

(63) Continuation of application No. 12/695,054, filed on Jan. 27, 2010, now Pat. No. 8,284,067.

(30) Foreign Application Priority Data

Jan. 28, 2009 (JP) ................................. 2009-017016
Jan. 9, 2010 (JP) ................................. 2010-003439

(51) Int. Cl.
| G08B 21/00 | (2006.01) |
| H04B 1/38 | (2006.01) |
| H02J 7/04 | (2006.01) |
| H02J 7/24 | (2006.01) |

(52) U.S. Cl.
USPC ............. 340/636.1; 340/636.12; 340/636.18; 455/573; 320/160; 320/162; 320/163

(58) Field of Classification Search
USPC .................... 340/636.1–636.2; 455/573, 574; 320/137, 163, 162, 164, 160
See application file for complete search history.

(56) References Cited

U.S. PATENT DOCUMENTS

| 6,678,538 B1 * | 1/2004 | Koizumi ....................... 455/574 |
| 6,744,234 B2 | 6/2004 | Odaohhara et al. |
| 2006/0073855 A1 * | 4/2006 | Bocking et al. ............... 455/567 |
| 2007/0052393 A1 | 3/2007 | Okayama |
| 2009/0045779 A1 * | 2/2009 | Sherman et al. .............. 320/136 |

FOREIGN PATENT DOCUMENTS

| JP | 2003-092841 | 3/2003 |
| JP | 2004-187351 A | 2/2004 |
| JP | 2007-74866 A | 3/2007 |

OTHER PUBLICATIONS

Office Action dated Dec. 10, 2013 from corresponding Japanese Patent Application No. 2010-003439, 6 pages.

* cited by examiner

*Primary Examiner* — Steven Lim
*Assistant Examiner* — Omeed Alizada
(74) *Attorney, Agent, or Firm* — Duane Morris LLP

(57) ABSTRACT

A delayed power-on function for an electronic device is disclosed. A charging unit charges a rechargeable battery with a pre-charge current when a voltage of the rechargeable battery is less than a voltage threshold value and with a current larger than the pre-charge current when the voltage of the rechargeable battery is greater than the voltage threshold value. A disabling unit can disable power-on when the voltage of the rechargeable battery is less than the voltage threshold value. A user may also be notified when power-on is disabled.

9 Claims, 12 Drawing Sheets

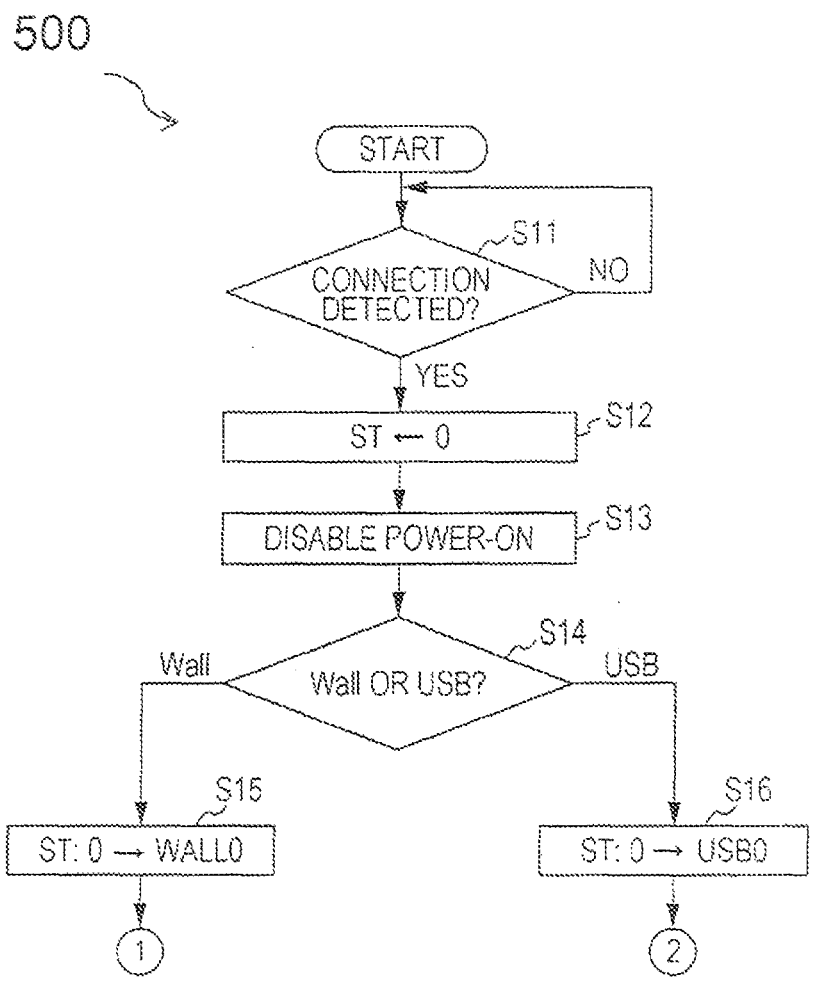

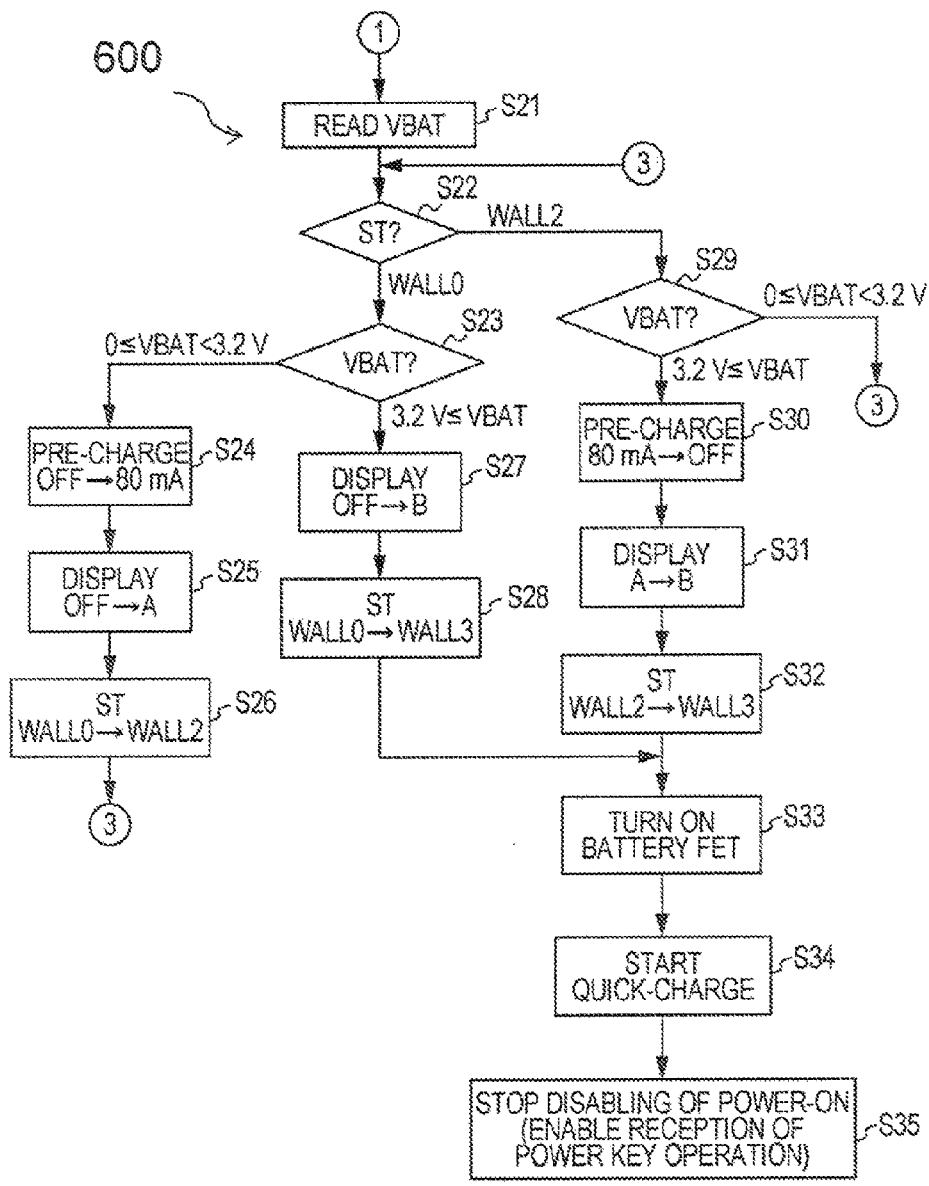

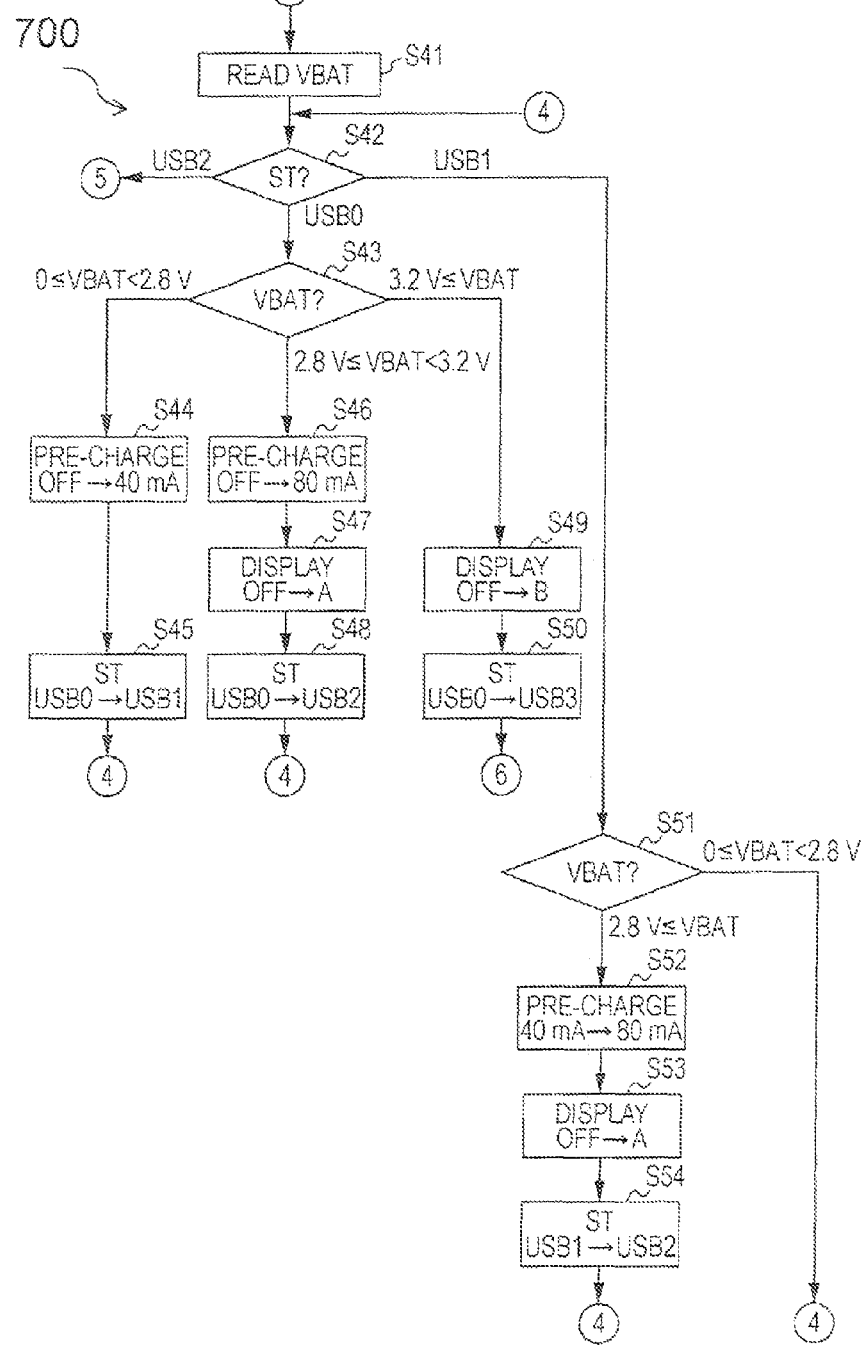

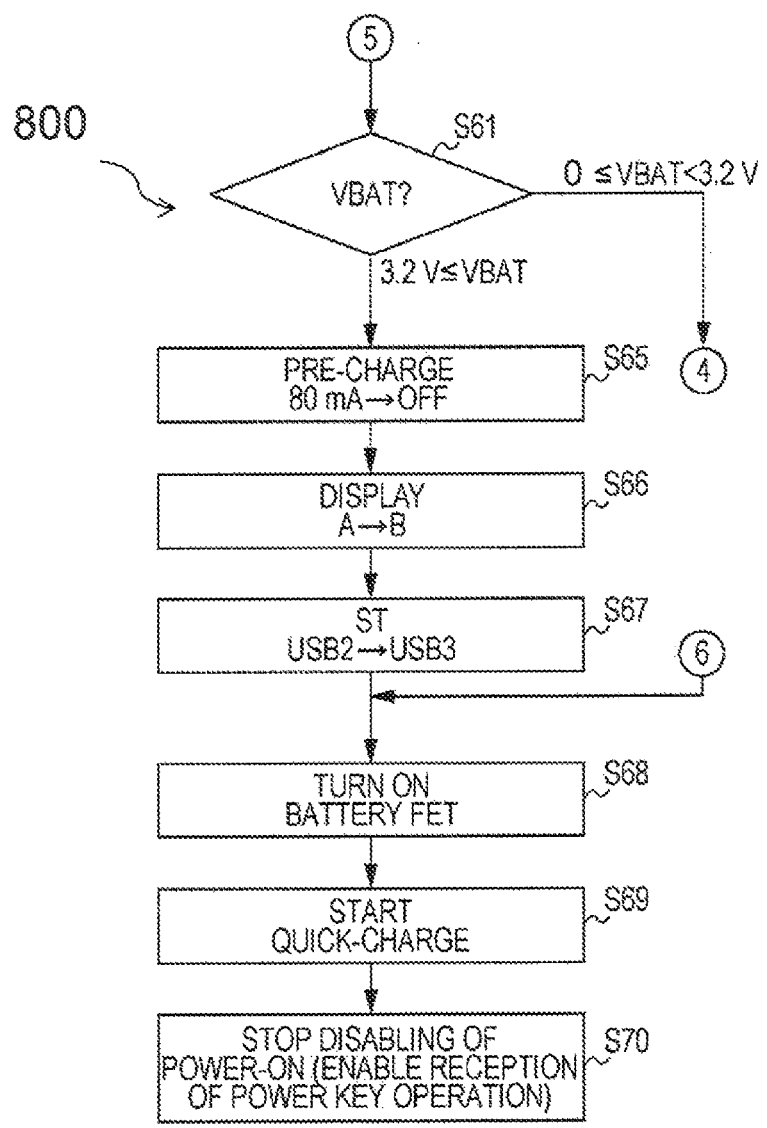

| STATE (ST) | VBAT | PRE-CHARGE (mA) | DISPLAY | DESTINATION STATE |
|---|---|---|---|---|
| WALL0 (INITIAL STATE) | 0≤VBAT<3.2 V | OFF→80 mA | OFF→A | WALL2 |
| | 3.2 V≤VBAT | --- | OFF→B | WALL3 |
| WALL2 (PRE-CHARGE) | 0≤VBAT<3.2 V | --- | --- | --- |
| | 3.2 V≤VBAT | 80 mA→OFF | A→B | WALL3 |

* WALL3 CORRESPONDS TO QUICK CHARGE.

| STATE (ST) | VBAT | PRE-CHARGE (mA) | DISPLAY | DESTINATION STATE |
|---|---|---|---|---|
| USB0 (INITIAL STATE) | 0≤VBAT<2.8 V | OFF→40 mA | --- | USB1 |
| | 2.8 V≤VBAT<3.2 V | OFF→80 mA | OFF→A | USB2 |
| | 3.2 V≤VBAT | --- | OFF→B | USB3 |
| USB1 (SECOND PRE-CHARGE) | 0≤VBAT<2.8 V | --- | --- | --- |
| | 2.8≤VBAT | 40 mA→80 mA | OFF→A | USB2 |
| USB2 (FIRST PRE-CHARGE) | 0≤VBAT<3.2 | --- | --- | --- |
| | 3.2 V≤VBAT | 80 mA→OFF | A→B | USB3 |

* USB3 CORRESPONDS TO QUICK CHARGE.

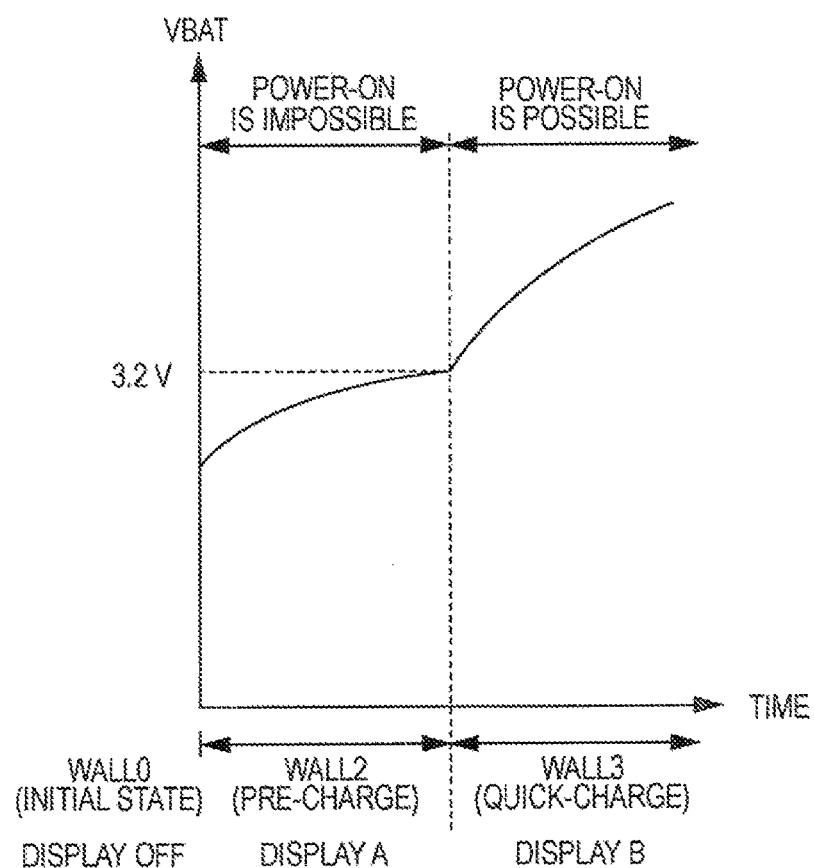

DELAYED POWER-ON FUNCTION FOR AN ELECTRONIC DEVICE

CROSS-REFERENCE TO RELATED APPLICATION

The present application is a continuation of U.S. patent application Ser. No. 12/695,054 filed Jan. 27, 2010 now U.S. Pat. No. 8,284,067, which claims priority under 35 U.S.C. §119 to Japanese Application No. 2009-017016, filed on Jan. 28, 2009, entitled "MOBILE DEVICE" and Japanese Application No. 2010-003439, filed on Jan. 9, 2010, entitled "ELECTRONIC DEVICE, METHOD FOR PROVIDING A NOTIFICATION OF A POWER-ON/OFF STATE AND PROGRAM FOR PROVIDING A NOTIFICATION OF A POWER-ON/OFF STATE". The contents of which are incorporated by reference herein in their entirety.

FIELD

Embodiments of the present disclosure relate generally to electronic devices, and more particularly relate to an electronic device with a rechargeable battery.

BACKGROUND

Many electronic devices use rechargeable batteries that are available for repeated charge and discharge cycles. When the rechargeable batteries are in an over-discharged condition, they may first be pre-charged with a low-current to ensure safety of the rechargeable battery and to reduce degradation of the battery. After the low-current pre-charge, the rechargeable battery is then charged with a quick charge having a larger current.

Pre-charge is generally performed when remaining battery life is short, and a voltage of the rechargeable battery is low. Under this condition, a capability of the rechargeable battery to supply current may be low. Therefore, if an electronic device such as a mobile phone is powered-on during the pre-charge, the electronic device may soon be shut off for lack of power after disconnection from a charger. Accordingly, it is preferable that no request for power-on be received by the electronic device during a low voltage charge such as a pre-charge.

Therefore, there is a need for enhanced usability during charging of a rechargeable battery of an electronic device.

SUMMARY

A delayed power-on function for an electronic device is disclosed. A charging unit charges a rechargeable battery with a pre-charge current when a voltage of the rechargeable battery is less than a voltage threshold value and with a current larger than the pre-charge current when the voltage of the rechargeable battery is equal to or greater than the voltage threshold value. A disabling unit disables power-on when the voltage of the rechargeable battery is less than the voltage threshold value. A user may also be notified when power-on is disabled.

An embodiment comprises an electronic device. The electronic device comprises a rechargeable battery, and a charging unit. The charging unit is operable to charge the rechargeable battery with a pre-charge current when a voltage of the rechargeable battery is less than a voltage threshold value. The charging unit is further operable to charge the rechargeable battery with a current that is larger than the pre-charge current, when the voltage of the rechargeable battery is equal to or greater than the voltage threshold value. The electronic device further comprises a disabling unit operable to disable power-on when the voltage of the rechargeable battery is less than the voltage threshold value. The electronic device also comprises a notifying unit operable to provide a power-on disabled notification, if the rechargeable battery is being charged with the pre-charge current and the pre-charge current is equal to or greater than a current threshold value.

An embodiment comprises a method for charging an electronic device. The method comprises charging a rechargeable battery with a pre-charge current when a voltage of the rechargeable battery is less than a voltage threshold value, and charging the rechargeable battery with a current that is larger than the pre-charge current, when the voltage of the rechargeable battery is equal to or greater than the voltage threshold value. The method further comprises disabling power-on when the voltage of the rechargeable battery is less than the voltage threshold value. The method also comprises providing a power-on disabled notification, if the rechargeable battery is being charged with the pre-charge current and the pre-charge current is equal to or greater than a current threshold value.

An embodiment comprises a computer-readable medium for an electronic device. The computer-readable medium comprises program code for charging a rechargeable battery with a pre-charge current when a voltage of the rechargeable battery is less than a voltage threshold value and charging the rechargeable battery with a current that is larger than the pre-charge current, when the voltage of the rechargeable battery is equal to or greater than the voltage threshold value. The computer-readable medium further comprises program code for disabling power-on when the voltage of the rechargeable battery is less than the voltage threshold value. The computer-readable medium also comprises program code for providing a power-on disabled notification, if the rechargeable battery is being charged with the pre-charge current and the pre-charge current is equal to or greater than a current threshold value.

BRIEF DESCRIPTION OF THE DRAWINGS

Embodiments of the present disclosure are hereinafter described in conjunction with the following figures, wherein like numerals denote like elements. The figures are provided for illustration and depict exemplary embodiments of the present disclosure. The figures are provided to facilitate understanding of the present disclosure without limiting the breadth, scope, scale, or applicability of the present disclosure. The drawings are not necessarily made to scale.

FIG. 5 is an illustration of a flow diagram showing an exemplary connection detection process for charging a mobile telephone according to an embodiment of the disclosure.

FIG. 6 is an illustration of a flow diagram showing an exemplary pre-charge process using an electrical outlet (wall connection), for charging a mobile telephone according to an embodiment of the disclosure.

FIG. 7 is an illustration of a flow diagram showing an exemplary pre-charge process using a USB connection for charging a mobile telephone according to an embodiment of the disclosure.

FIG. 8 is an illustration of a flow diagram showing an exemplary quick charge process for charging a mobile telephone according to an embodiment of the disclosure.

FIG. 10 is an illustration of an exemplary state transition diagram for charging a mobile telephone corresponding to the flow diagram of FIG. 6.

FIG. 11 is an illustration of an exemplary state transition diagram for charging a mobile telephone corresponding to the flow diagram of FIGS. 7 and 8.

FIG. 12 is an illustration of a graph showing an exemplary relationship between a rechargeable battery voltage (VBAT) and time when a state variable ST has a value of WALL (0, 2, 3) according to an embodiment of the disclosure.

DETAILED DESCRIPTION OF EXEMPLARY EMBODIMENTS

The following description is presented to enable a person of ordinary skill in the art to make and use the embodiments of the disclosure. The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. Furthermore, there is no intention to be bound by any expressed or implied theory presented in the preceding technical field, background, brief summary or the following detailed description. The present disclosure should be accorded scope consistent with the claims, and not limited to the examples described and shown herein.

Embodiments of the disclosure are described herein in the context of one practical non-limiting application, namely, a mobile phone. Embodiments of the disclosure, however, are not limited to such mobile phones, and the techniques described herein may also be utilized in other applications. For example, embodiments may be applicable to digital cameras, electronic game machines, digital music players, personal digital assistance (PDA), personal handy phone system (PHS), lap top computers, tablet personal computer (tablet PC), and the like.

As would be apparent to one of ordinary skill in the art after reading this description, these are merely examples and the embodiments of the disclosure are not limited to operating in accordance with these examples. Other embodiments may be utilized and structural changes may be made without departing from the scope of the exemplary embodiments of the present disclosure.

Figure 1:
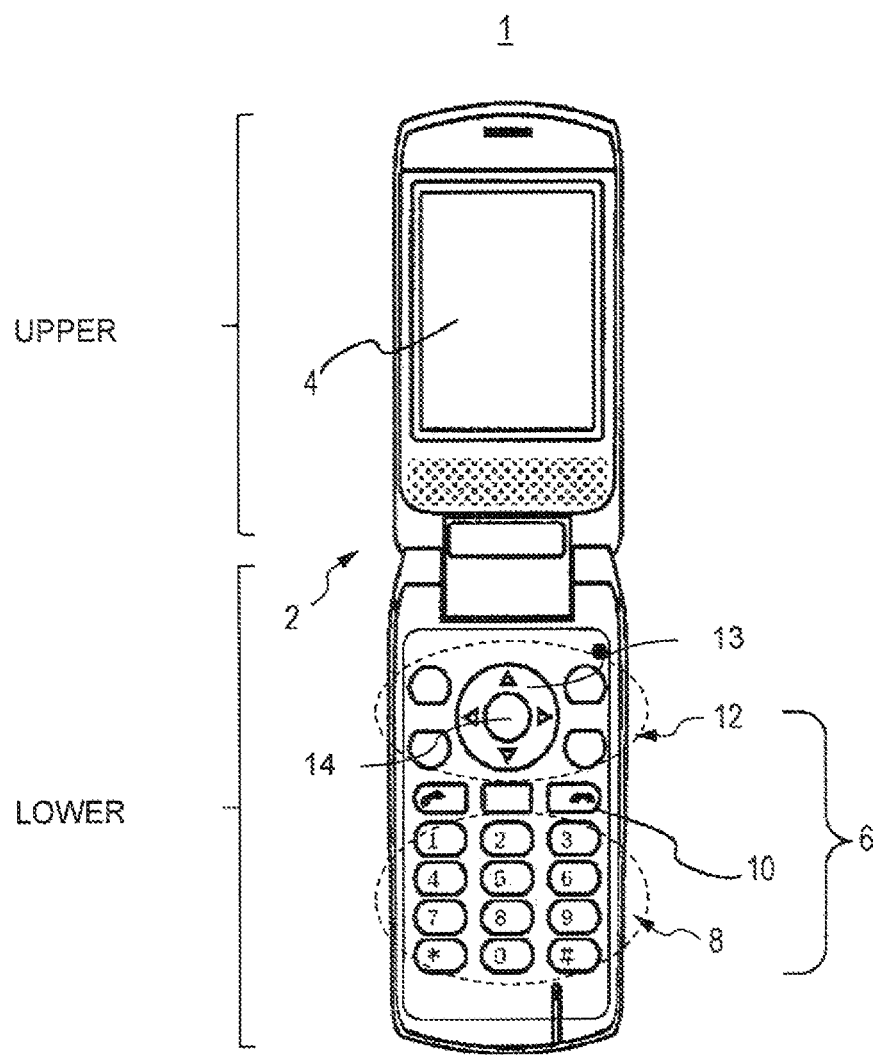
FIG. 1 is an illustration of an exemplary external view of a mobile telephone according to an embodiment of the disclosure.

FIG. 1 is an illustration of an exemplary external view of a mobile telephone 1 according to an embodiment of the disclosure. The mobile telephone 1 comprises a foldable casing 2 comprising an upper part and a lower part, a display unit 4 located on the upper part, and an operation key unit 6 located on the lower part.

The display unit 4 may be a liquid crystal display (LCD) comprising a screen for displaying various kinds of information. The display unit 4 may be, for example but without limitation, a liquid crystal display panel (LCD) comprising a screen with about 3-inches width.

The operation key unit 6 comprises operation keys such as dial keys 8, at least one power key 10, and a functional key group 12. The dial keys 8 are used for inputting, for example but without limitation, a telephone number, a text message, and the like. The power key 10 is used for turning power on or off to the mobile phone 1. The power may be turned on or off by activation or pressing and holding the power key 10 down for a short time, such as for about one second. The power key 10 is also used for ending a call in progress and for terminating an activity. The functional key group 12 comprises a cursor key 13 for moving a cursor up or down and right or left, and a function key 14 for bringing up a function, such as a mail, a camera, or a telephone conversation function. Each of the operation keys may be made of, for example but without limitation, transparent resin material, and the like. An embedded key light-emitting diode (LED) may be suitably located in each of the operation keys for illuminating each of the operation keys.

Figure 2:
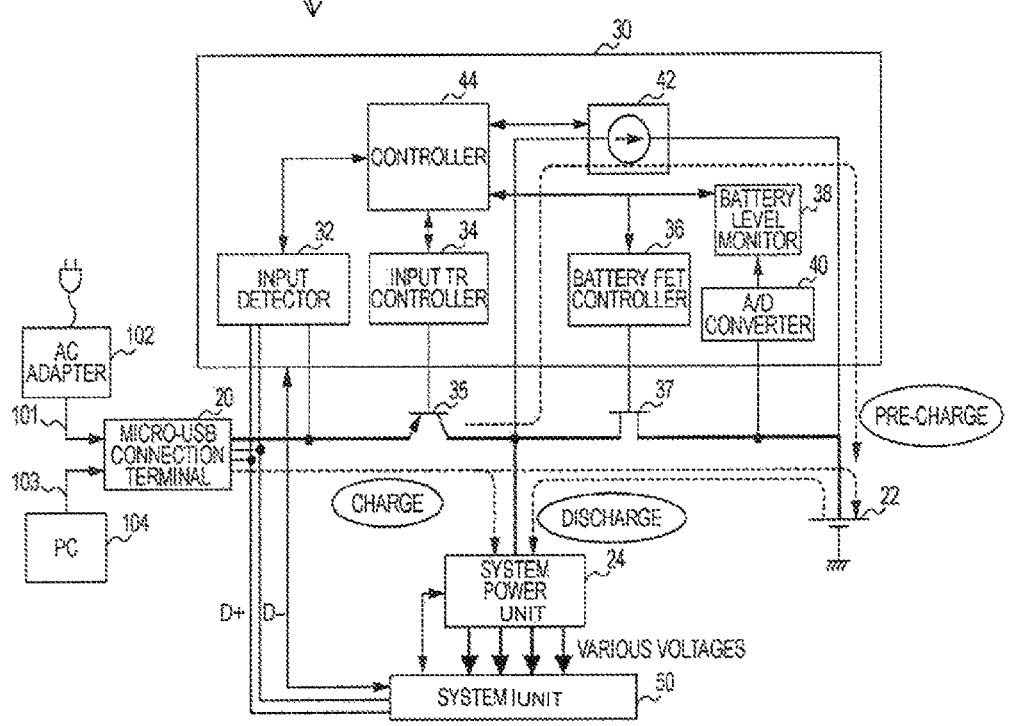
FIG. 2 is an illustration of an exemplary functional block diagram of a charge and discharge control system of the mobile telephone shown FIG. 1.

FIG. 2 is an illustration of an exemplary functional block diagram of a charge and discharge control system 200 of the mobile telephone 1. The charge and discharge control system 200 comprises a connection terminal 20, a rechargeable battery 22, a system power unit 24, a charge and discharge control unit 30, and a system unit 50. The connection terminal 20 is a terminal for connection with a Micro-Universal Serial Bus (Micro-USB) compliant cable and is located on at least one side of the casing 2 (FIG. 1). The connection terminal 20 can be connected to an alternating-current (AC) adapter 102 through an adapter cable 101 compliant with the Micro-USB and to a personal computer (PC) 104 through a Universal Serial Bus (USB) cable 103.

The rechargeable battery 22 can repeat charge and discharge cycles. The rechargeable battery 22 may be, for example but without limitation, a lithium-ion battery, or the like.

The system power unit 24 supplies voltages having various voltage values required for driving the system unit 50.

The charge and discharge control unit (charging unit) 30 comprises an input detector 32, an input transistor (TR) controller 34, a battery Field Effect Transistor (FET) controller 36, a battery level monitor 38, an analog-to-digital (A/D) converter 40, a pre-charge circuit 42, and a controller 44.

The input detector 32 detects an input (connection) of a cable to the connection terminal 20. The input TR controller 34 switches between ON and OFF states of an input TR 35 such that the input TR 35 is set at an ON state while the input detector 32 detects the input and at an OFF state while the input detector 32 does not detect the input. The battery FET controller 36 switches between ON and OFF states of a battery FET 37. The battery FET controller 36 sets the battery FET 37 at an ON state for quick charge and at an OFF state for pre-charge, i.e., first and second pre-charge.

The battery-level monitor 38 supplies a voltage level to the controller 44. The voltage level represents a voltage of the rechargeable battery 22 converted by the analog-to-digital (A/D) converter 40.

The pre-charge circuit 42 supplies a pre-charge current to the rechargeable battery 22. The pre-charge current has a constant value, such as 40 mA or 80 mA, received from an external power supply. The controller 44 comprises a read-only memory (ROM) storing a charge control program, a central processing unit (CPU) for executing a program, and a random-access memory (RAM) serving as a work area for a program and controls the functional blocks of the charge and discharge control unit 30. The controller 44 also manages a state variable (ST) indicating a state of charge on the RAM.

As described above, at least two kinds of cables, the adapter cable 101 for the AC adapter 102 and the USB cable 103 for the PC 104, are connectable to the connection terminal 20. The determination of which cable is connected to the connection terminal 20 can be made in the following way.

Figure 3A:
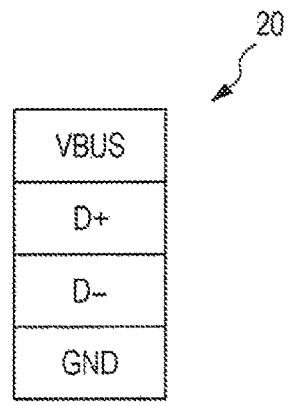
FIG. 3A is an illustration of a schematic structure of a connection terminal used for connection with a Micro-Universal Serial Bus (Micro-USB) compliant cable.
Figure 3B:
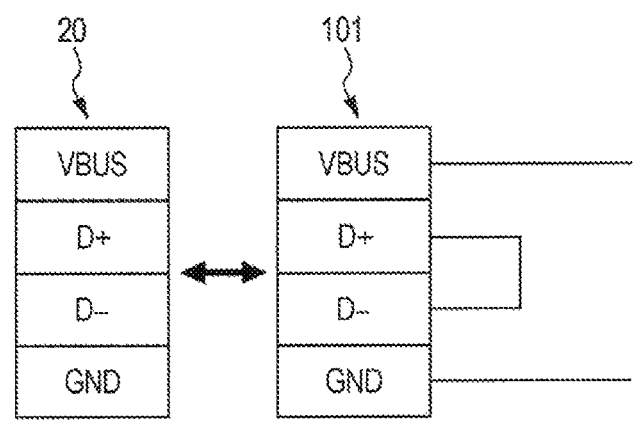
FIG. 3B is an illustration of schematic structures of a connection terminal used for connection with a Micro-USB compliant cable, and an adapter cable used for an AC adapter.
Figure 3C:
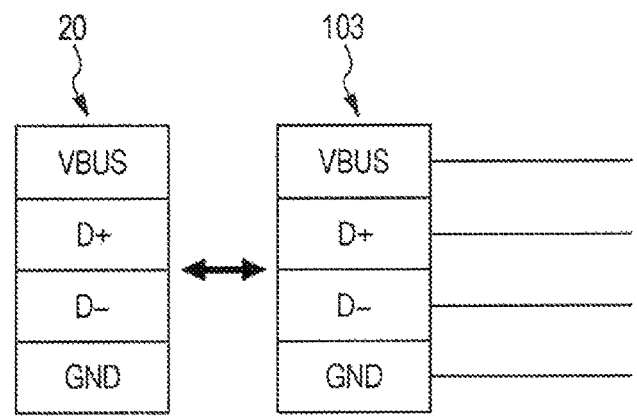
FIG. 3C is an illustration of schematic structures of a connection terminal used for connection with a Micro-USB compliant cable, and a structure of a Universal Serial Bus (USB) cable used for a PC.

FIG. 3A is an illustration of a schematic structure of a connection terminal 20 used for connection with a Micro-Universal Serial Bus (Micro-USB) compliant cable. FIG. 3B is an illustration of schematic structures of a connection terminal used for connection with a Micro-USB compliant cable, and an adapter cable used for an AC adapter. FIG. 3C is an illustration of schematic structures of a connection terminal used for connection with a Micro-USB compliant cable, and a structure of a USB cable used for a PC.

As illustrated in FIG. 3A, the connection terminal 20 comprises a VBUS terminal, a pair of data lines D+ and D−, and a ground terminal GND. Similarly, as illustrated in FIGS. 3B and 3C, each of the adapter cable 101 for the AC adapter 102 and the USB cable 103 comprises a VBUS terminal, a pair of data lines D+ and D−, and a ground terminal GND. The pair of data lines D+ and D− of the adapter cable 101 are coupled together in a loopback fashion. In contrast, the pair of data lines D+ and D− of the USB cable 103 are not coupled together in a loopback fashion.

After the input detector 32 detects connection of a cable to the connection terminal 20, the data line D− may become high. When a high signal is input into the data line D+ of the connection terminal 20, if the data line D− also becomes high, it can be determined that the connection terminal 20 is connected to the adapter cable 101 for the AC adapter 102. In contrast, even when a high signal is input into the data line D+ of the connection terminal 20, if the data line D− does not become high, it can be determined that the connection terminal 20 is connected to the USB cable 103.

Figure 4:
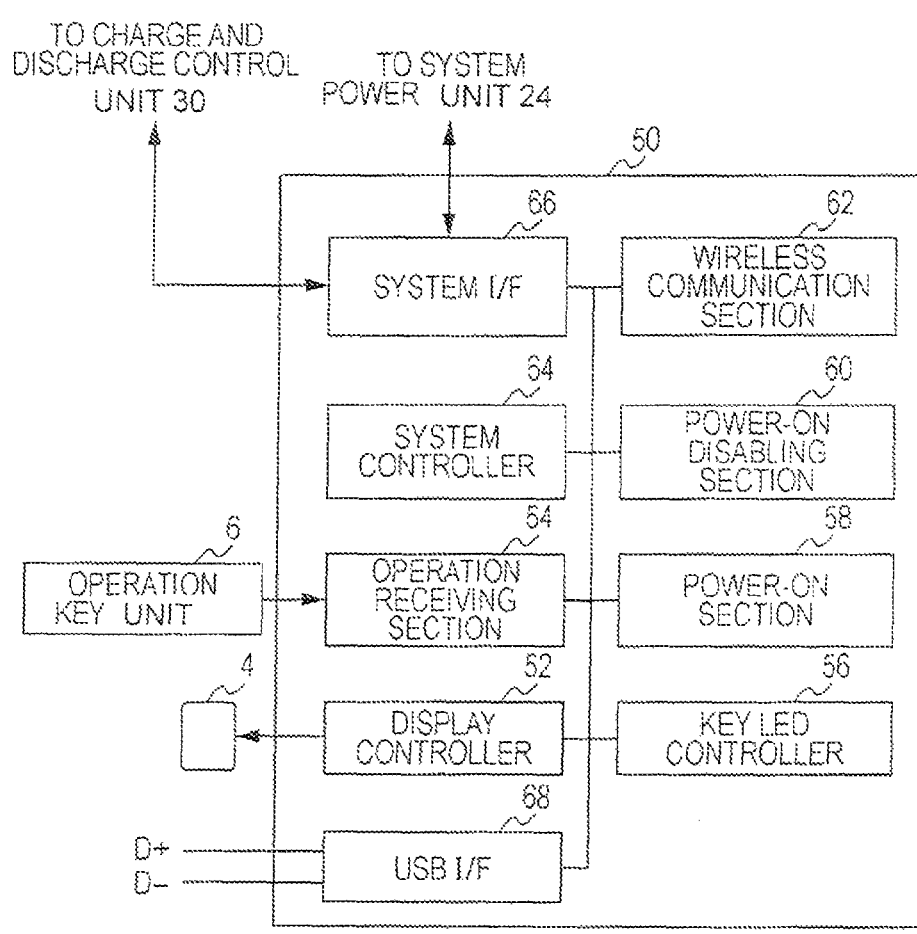
FIG. 4 is an illustration of an exemplary detailed functional block diagram of a system unit of the charge and discharge control system shown in FIG. 1.

FIG. 4 is an illustration of an exemplary detailed functional block diagram of a system unit 400 (system unit 50) of the charge and discharge control system 200 shown in FIG. 2. The system unit 400 comprises a display controller 52, an operation receiving section 54, a key LED controller 56, a power-on section 58, a power-on disabling section 60 (disabling unit 60), a wireless communication section 62, a system controller 64 (notifying unit 64), a system interface (I/F) 66, and a USB interface (I/F) 68.

The display controller 52 controls a display content appearing on a screen of the display unit 4. The operation receiving section 54 receives a key operation from the operation key unit 6. The key LED controller 56 controls the light emission of the key LED located on the bottom of each of the operation keys.

The power-on section 58 powers the mobile telephone 1 ON when the operation receiving section 54 receives an activation or a long press of about 1 second on the power key 10 in a power-off state. The mobile telephone 1 is brought into a normal usage state when it is being powered on. In the normal usage state, functions such mail function, camera function, and telephone-conversation function are available. Functions of the mobile telephone 1 that require a large current, such as using a wireless circuit, are made available by power-on.

The power-on disabling section 60 causes a disabled state by disabling the power-on caused by the power-on section 58. During the disabled state, even if the power key 10 receives an activation or a long press of about 1 second on the power key 10 in a power-off state, the mobile telephone 1 is not powered on. The power-on disabling section 60 cancels an input signal from the power key 10 during the disabled state, thereby disabling power-on caused by the power-on section 58. That is, in this embodiment, the disabling power-on may be performed in software. However, in an embodiment, the disabling power-on may be performed in hardware. For example, the power-on disabling section 60 or other suitable key controllers may block or disable a power-on signal or voltage from the power key 10 thereby disabling power-on caused by the power-on section 58. In this manner, disabling power-on may be performed using hardware.

The wireless communication section 62 may comprise, for example, a radio-frequency wireless communication circuit. The wireless communication section 62 can perform a telephone conversation function, a mail function, and the like of the mobile telephone 1 by communicating with a base station via their respective antennas through a wireless communication channel.

The system controller 64 comprises a ROM for storing a system control program, a CPU for executing a program, and a RAM serving as a work area for a program and controlling the system unit 400.

The system I/F 66 is an interface for use in exchanging data with the system power unit 24 and the charge and discharge control unit 30. The system controller 64 controls the system 400 based acquired information acquired through the system I/F 66. The acquired information may comprises, for example but without limitation, a presence/absence of connection detected by the input detector 32, a state of charge (pre-charge or quick charge), the voltage level of the battery level monitor 38 as needed, and the like.

The USB I/F 68 is a circuit for transmitting and receiving USB data.

FIGS. 5 to 8 are flow diagrams that illustrate processes 500-800 for charging of the mobile telephone 1 according to various embodiments of the disclosure. FIG. 5 is an illustration of a flow diagram showing an exemplary connection detection process 500 for charging a mobile telephone 1. FIG. 6 is an illustration of a flow diagram showing an exemplary pre-charge process 600 in a case of a Wall connection for charging the mobile telephone 1. FIG. 7 is an illustration of a flow diagram showing an exemplary pre-charge process 700 when a USB connection used for charging the mobile telephone 1. FIG. 8 is an illustration of a flow diagram showing an exemplary quick charge process 800 for charging the mobile telephone 1.

The various tasks performed in connection with processes 500-800 may be performed by software, hardware, firmware, a computer-readable medium having computer executable instructions for performing the process method, or any combination thereof. The processes 500-800 may be recorded in a computer-readable medium such as a semiconductor memory, a magnetic disk, an optical disk, and the like, and can be accessed and executed, for example, by a computer CPU in which the computer-readable medium is stored. It should be appreciated that processes 500-800 may include any number of additional or alternative tasks, the tasks shown in FIGS. 5-8 need not be performed in the illustrated order, and processes 500-800 may be incorporated into a more comprehensive procedure or process having additional functionality not described in detail herein. For illustrative purposes, the following description of processes 500-800 may refer to elements mentioned above in connection with FIGS. 1-4. In practical embodiments, portions of processes 500-800 may be performed by different elements of the charge and discharge control system 200, for charging/discharging the mobile telephone 1, e.g., the connection terminal 20, the rechargeable battery 22, the system power unit 24, the charge and discharge control unit 30, the system unit 50, etc.

In the processes 500-800, voltage level of the battery level monitor 38 is referred to as the rechargeable battery voltage VBAT, and voltage threshold values of the VBAT are, for example but limitation, about 3.2 V and about 2.8 V for the wall connection (WALL) and the USB connections respectively.

Process 500 may begin by the input detector 32 detecting a connection of a cable to the connection terminal 20 (YES branch of inquiry task S11), the system controller 64 acquires a signal indicating the detection from the controller 44 via the system interface (I/F) 66 and causes the power-on disabling section 60 to disable power-on (Task S13).

Then, the input detector 32 determines whether the connection terminal 20 is connected to the adapter cable 101 for the AC adapter 102 (i.e., from an electrical outlet or wall connection) or to the USB cable 103 (USB connection) (Inquiry task S14). The determination is made utilizing the difference between the presence of the loopback connection of D+ and D− in the case of the adapter cable 101 and the absence thereof in the case of the USB cable 103, as described above (FIG. 3).

If it is determined that a wall connection (i.e., an electrical outlet is a power source) is detected (WALL branch of the inquiry task S14), the controller 44 changes ST to WALL0 (Task S25) and reads the VBAT (Task S21 in FIG. 6). If ST is WALL0 (WALL0 branch of inquiry task S22) and the VBAT is equal to or greater than 0 and less than 3.2 V ($0 \leq$ VBAT<3.2 V branch of inquiry task S23), the controller 44 starts pre-charge the rechargeable battery 22 with a first pre-charge current of about 80 mA (Task S24).

Figure 9A:
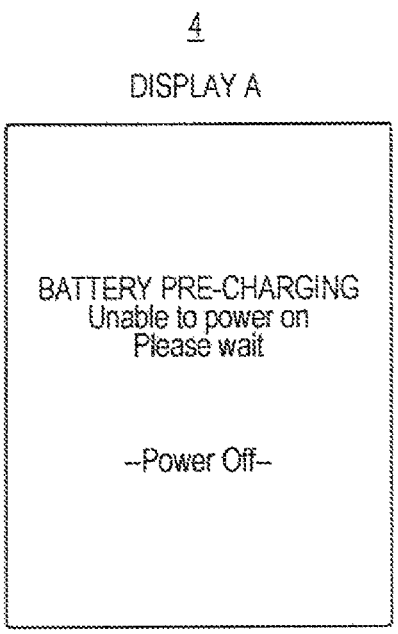
FIG. 9A is an illustration of an exemplary display content on a screen of a display unit according to an embodiment of the disclosure.

The system controller 64 causes the display controller 52 to show content of display A shown in FIG. 9A on the screen of the display unit 4 (Task S25) to provide a power-on disabled notification. The controller 44 changes ST from WALL0 indicating an initial state to WALL2 indicating a state of the first pre-charge (Task S26).

If it is determined that the VBAT is not less than 3.2 V (3.2 V$\leq$VBAT branch of inquiry task S23), the controller 44 does not perform the first pre-charge. The system controller 64 causes the display controller 52 to display content of display B shown in FIG. 9B on the screen of the display unit 4 (Task S27). The controller 44 changes ST from WALL0 indicating an initial state to WALL3 indicating a state of a quick charge (Task S28).

If ST is WALL2 (WALL2 branch of inquiry task S22) and VBAT is equal to or greater than 0 and less than 3.2 V ($0 \leq$VBAT<3.2 V branch of inquiry task S29), process 600 leads back to task S22, and the first pre-charge continues. When the VBAT reaches a voltage level equal to or greater than 3.2 V by the first pre-charge (3.2 V$\leq$VBAT branch of inquiry task S29), the controller 44 completes the first pre-charge (Task S30). The system controller 64 causes the display controller 52 to change the display content from the display A to the display B (Task S31). The controller 44 changes ST from WALL2 to WALL3 (Task S32).

After changing the state to WALL3 (Tasks S28 and S32), the controller 44 turns the battery FET 37 ON (Task S33) and starts a quick charge (Task S34). Charge current used for the quick charge current may be, for example but without limitation, about 500 mA and the like.

The system controller 64 then acquires the state WALL3 from the controller 44, and deactivates the power-on disabling section 60 such that reception of the power key operation is enabled (Task S35). In this manner, the power-on section 58 is enabled to receive a request for power-on via the power key operation.

A charge process using the USB connection is described below.

As illustrated in FIG. 5, when the input detector 32 determines that USB connection is detected (USB branch of inquiry task S14), the controller 44 changes ST to USB0 and reads the VBAT (Task S41 in process 700). Then, if ST is USB0 (USB0 branch of inquiry task S42) and the VBAT is equal to or greater than 0 and less than 2.8 V ($0 \leq$VBAT<2.8 V branch of inquiry task S43), the controller 44 starts the pre-charge with a second pre-charge current of about 40 mA (Task S44). The controller 44 changes ST from USB0 indicating an initial state to USB1 indicating a state of second pre-charge (Task S45).

During the second pre-charge ($0 \leq$VBAT<2.8 V branch of inquiry task S43), the display unit 4 is not turned ON and no information is displayed on the screen thereon. The USB specifications limit the capability of VBUS current supply from a host PC to a substantially maximum value of about 100 mA. In an embodiment, even when the VBAT is low such that the current is insufficient for displaying information on the screen of the display unit 4, the pre-charge can be stably performed by not turning on the display unit 4.

When the VBAT is equal to or greater than 2.8 V and less than 3.2 V (2.8 V$\leq$VBAT<3.2 V branch of inquiry task S43), the first pre-charge with a current of 80 mA (Task S46), the display A (Task S47), and changing ST from USB0 to USB2 (Task S48) are performed. When the VBAT is equal to or greater than 3.2 V (3.2 V$\leq$VBAT branch of inquiry task S43), pre-charge is not performed, and the content of the display B (Task S49) and changing ST from USB0 to USB3 (Task S50) are performed. In this case, where the VBAT is relatively large, the battery FET 37 is turned ON (Task S68 in FIG. 8), and the quick charge with the current of 500 mA is performed (Task S69 in FIG. 8).

When ST is USB1 (USB1 branch of inquiry task S42 in FIG. 7) and the VBAT is equal to or greater than 0 and less than 2.8 V ($0 \leq$VBAT<2.8 V branch of inquiry task S51), the process 700 leads back to task S42. When VBAT is equal to or greater than 2.8 V (2.8 V$\leq$VBAT branch of inquiry task S51), the first pre-charge with a current of 80 mA (Task S52), displaying the content of display A (Task S53), and changing ST from USB1 to USB2 (Task S54) are performed.

If ST is USB2 (USB2 branch of inquiry task S42) and the VBAT is equal to or greater than 0 V and less than 3.2 V (0 V$\leq$VBAT<3.2 V branch of inquiry task S61 in FIG. 8, process 800 leads back to step S42 of process 700. If ST is USB2 (USB2 branch of inquiry task S42) and the VBAT is equal to or greater than 3.2 V (3.2 V$\leq$VBAT branch of inquiry task S61), no pre-charge is performed (Task S65) and presenting the content of the display B (Task S66) and changing ST from USB2 to USB3 (Task S67) are performed.

When changing ST to the state USB3, the controller 44 performs a USB connection process with the PC 104 (host PC) through the USB I/F 68 and requests the PC 104 to increase the capability of VBUS current supply from 100 mA to 500 mA. When the request is accepted, the controller 44 turns the battery FET 37 ON and performs quick charge with a current of 500 mA.

That is, when changing ST to the state USB3 (Task S67), the controller 44 then turns the battery FET 37 ON (Task S68) and starts the quick charge (Task S69). When acquiring the state USB3 from the controller 44, the system controller 64 then deactivates the power-on disabling section 60 such that reception of the power key operation is enabled (Task S70). In this manner, the power-on section 58 is enabled to receive a request for power-on via the power key operation.

FIG. 9A is an illustration of an exemplary display content A (display A) on the screen of the display unit 4 according to an embodiment of the disclosure. As illustrated in FIG. 9A, the display A presented during the pre-charge (first pre-charge) indicates a power-on disabled notification. The power-on disabled notification comprises messages showing: "BATTERY PRE-CHARGING" indicating that pre-charge is being performed, "Unable to power on" indicating that a request for power-on cannot be received, "Please wait" indicating that a user is prompted to wait, and "--Power Off--" indicating that the mobile telephone 1 is powered off. These messages can inform the user that power-on is disabled and that the disabling of power-on results from pre-charge being performed. The message "Please wait" prompts the user to wait, thus reducing the possibility that the pre-charge is stopped by the user disconnecting the adapter cable 101 or the USB cable 103 from the connection terminal 20 during the pre-charge. The message "Please wait" notifies the user that if he/she waits for a certain period of time power-on becomes available.

Figure 9B:
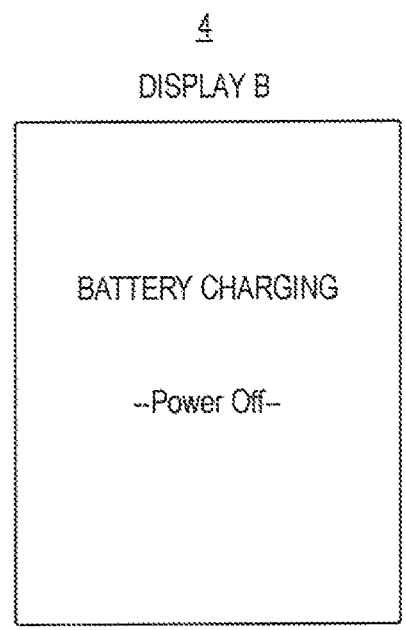
FIG. 9B is an illustration of an exemplary display content on a screen of a display unit according to an embodiment of the disclosure.

FIG. 9B is an illustration of an exemplary display content B (display B) on the screen of the display unit 4 according to an embodiment of the disclosure. As illustrated in FIG. 9B, the display B presented during the quick charge comprises messages showing: "BATTERY CHARGING" indicating that charge is being performed and showing "--Power Off--" indicating that the mobile telephone 1 is not powered on. As described above, the display B illustrated in FIG. 9B does not contain "Unable to power on" in the display A illustrated in FIG. 9A. Therefore, the user can be notified that power-on is available.

Contents of the display A and display B presented on the display unit 4 are not limited to the content of display A illustrated in FIG. 9A and the content of display B illustrated in FIG. 9B. For example, display during the quick charge may contain a message showing "Able to power on" indicating that power-on is available. The contents of display A and B may comprise, for example but without limitation, a graphical representation, a symbol, alphabets of various languages, and any combination thereof.

FIGS. 10 and 11 illustrate state transition diagrams for charging of the mobile telephone 1. FIG. 10 is an illustration of an exemplary state transition diagram 70 for charging the mobile telephone 1 corresponding to the flow diagram of FIG. 6. FIG. 11 is an illustration of an exemplary state transition diagram 72 for charging the mobile telephone 1 corresponding to the flow diagram of FIGS. 7 and 8.

In FIGS. 10 and 11, "OFF" in the column "DISPLAY" indicates a state where no display relating to charge is made on the display unit 4. "A" in the column "DISPLAY" indicates a state where the display A illustrated in FIG. 9A is presented on the display unit 4. "B" in the column "DISPLAY" indicates a state where the display B illustrated in FIG. 9B is presented on the display unit 4.

"OFF→A" in the column "DISPLAY" indicates that the display appearing on the display unit 4 changes from the off state to the display A. "OFF→B" in the column "DISPLAY" indicates that the display appearing on the display unit 4 changes from an off state to the display B.

An item containing an arrow "→" in FIGS. 10 and 11 indicates that, when the value of VBAT is within the range specified in the column, the state transitions from a state located at the tail of the arrow to a state pointed by the tip of the arrow. A horizontal bar "---" indicates that the state does not transition.

Figure 13:
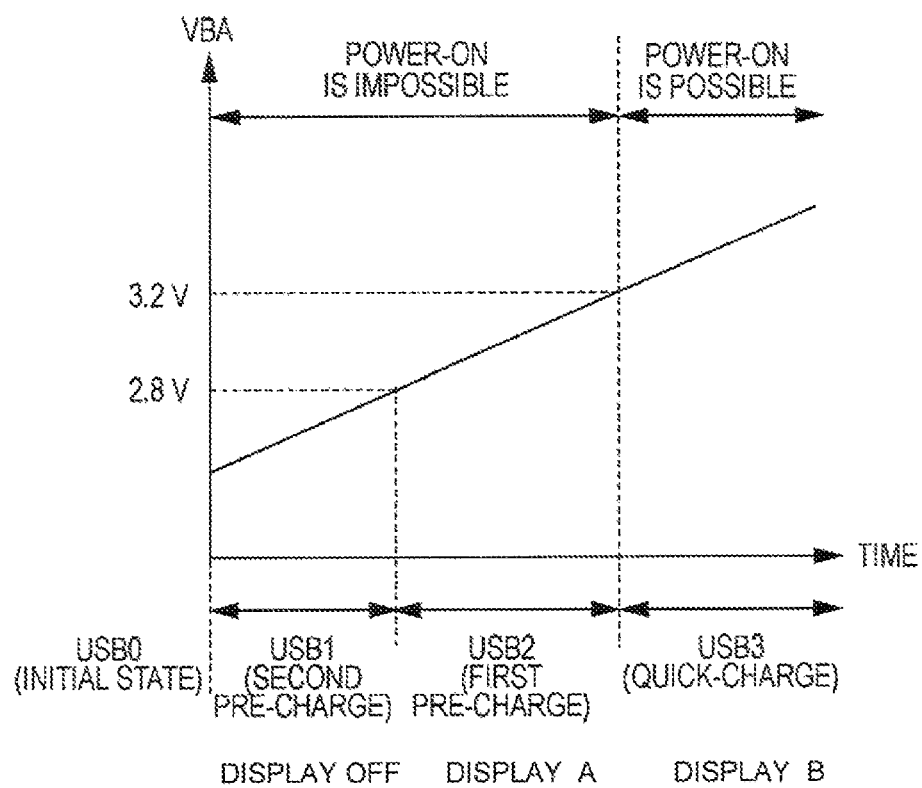
FIG. 13 is an illustration of a graph showing an exemplary relationship between VBAT and time when ST has a value of USB (0-3) according to an embodiment of the disclosure.

FIG. 12 is an illustration of a graph showing an exemplary relationship between the VBAT and time when ST is the WALL according to an embodiment of the disclosure. FIG. 13 is an illustration of a graph an exemplary relationship between the VBAT and time when ST is the USB according to an embodiment of the disclosure.

As described above, because the display A (FIG. 9A) is presented on the display unit 4 during the first pre-charge, the user can be notified that power-on is disabled. This notification allows the user to be informed that power-on is available. Accordingly, under conditions where it is difficult to stably power the mobile telephone 1 ON without causing the user to suspect a breakdown, the occurrence of power-on made by the user can be reduced, so usability of the charge process can be enhanced.

In the present embodiment, the notification indicating that power-on is disabled is provided to the user by use of the display A appearing on the display unit 4. The notification may be provided by use of the key LED for the operation key unit 6.

For example, a color of emission from the key LED for the operation key unit 6 may be yellow (emission color A) during the first pre-charge, and it may be red (emission color B) during the quick charge to provide the notification accordingly. Other colors may also be used for such notifications. If the key LED is employed, the notification may be provided by use of an emission from the key LED without turning ON the display unit 4. Alternatively, the notification may be provided by both emissions from the key LED and by presenting the notification on the display unit 4.

Notifying means can also be any means other than visual means. The notifying means may appeal to at least one of the five senses such as hearing, touch, and the like. For example, notifying means for hearing may be used alone, or in combination with any other notifying means. In this manner, the notification indicating that power-on is disabled may be provided by a sound.

In an embodiment, a charge process by which charge is shifted from the pre-charge to the quick charge is described above where both processes use constant currents. However, the charge process is not limited to the above process. Other processes can also be used under conditions where a voltage is low such that it may be necessary to disable power-on.

In an embodiment, under normal conditions, the display A may not be presented even during the first pre-charge. Upon activation or receipt of the press of an operation key of the operation key unit 6, the content of display A (display A) may be presented on the screen of the display unit 4 for a predetermined period of time (e.g., approximately five seconds). For example, the display A may be presented on the screen of the display unit 4 in response to activation of the power key 10.

In an embodiment, for charge during the USB connection, from the USB specifications, the substantially maximum current that can be supplied before a connection is established is about 100 mA and that after a connection may be established the substantially maximum current may be several hundreds of mA (e.g., 400 mA).

Because of this, before a connection is established or when a connection cannot be established, 100 mA is supplied. As such, the first pre-charge may not be performed with a current of 80 mA. In these cases, even when the VBAT is equal to or greater than 2.8 V (2.8 V≤VBAT<3.2 V inquiry branch of task S43 in FIG. 7), the second pre-charge with the second pre-charge current of about 40 mA may be performed (Task S44), and the display A may not be presented on the screen of the display unit 4.

The first pre-charge current for the first pre-charge may be, for example but without limitation, about 80 mA, and the like. The second pre-charge current for the second pre-charge may be, for example but without limitation, about 40 mA, and the like.

During a USB connection, when a charging current (pre-charge current) of the rechargeable battery 22 is less than a current threshold value, the notifying unit 64 does not provide the above notification. However, in such a case, the above notification may be provided by a method different from a method used when the pre-charge current is equal to or greater than the current threshold value. For example, when the pre-charge current is equal to or greater than the current threshold value, the notification may be provided by presenting a message on the screen of the display unit 4, and when the pre-charge current is lower than the current threshold value, the notification may be provide by use of the key LED. That is, a notification means requiring lower power consumption such as presenting a message on the display unit 4 may be used when the pre-charge current is equal to or greater than the current threshold value and a notification means requiring higher power consumption such as the key LED may be used when the pre-charge current is lower than the current threshold value. The current threshold value may be, for example and without limitation, 100 mA and the like.

In this document, the terms "computer program product", "computer-readable medium", and the like may be used generally to refer to media such as, for example, memory, storage devices, or storage unit. These and other forms of computer-readable media may be involved in storing one or more instructions for use by the processor/controller 44 and/or the system controller 64 to cause the processor/controller 44 and/or the system controller 64 to perform specified operations. Such instructions, generally referred to as "computer program code" or "program code" (which may be grouped in the form of computer programs or other groupings), when executed, enable an electronic device such as the charge and discharge control system 200 of the mobile telephone 1.

While at least one exemplary embodiment has been presented in the foregoing detailed description, the disclosure is not limited to the above-described embodiment or embodiments. Variations may be apparent to those skilled in the art. In carrying out the disclosure, various modifications, combinations, sub-combinations and alterations may occur in regard to the elements of the above-described embodiment insofar as they are within the technical scope of the disclosure or the equivalents thereof. The exemplary embodiment or exemplary embodiments are examples, and are not intended to limit the scope, applicability, or configuration of the disclosure in any way. Rather, the foregoing detailed description will provide those skilled in the art with a template for implementing the exemplary embodiment or exemplary embodiments. It should be understood that various changes can be made in the function and arrangement of elements without departing from the scope of the disclosure as set forth in the appended claims and the legal equivalents thereof. Furthermore, although embodiments of the disclosure have been described with reference to the accompanying drawings, it is to be noted that changes and modifications may be apparent to those skilled in the art. Such changes and modifications are to be understood as being comprised within the scope of the disclosure as defined by the claims.

Terms and phrases used in this document, and variations hereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items in the grouping be present, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent. The term "about" when referring to a numerical value or range is intended to encompass values resulting from experimental error that can occur when taking measurements.

The invention claimed is:

1. An electronic device comprising:
   a battery;
   a charging unit operable to charge the battery in a power-off state;
   a disabling unit operable to disable power-on of the electronic device, if a voltage of the battery is less than a first voltage threshold value and if the battery is being charged in the power-off state; and
   a notifying unit operable to:
   provide a power-on disabled notification indicating that the battery has not reached the first voltage threshold, if the power-on is disabled and if the battery is being charged in the power-off state; and
   provide a power-on enabled notification, if the voltage of the battery is equal to or greater than the first voltage threshold value and if the battery is being charged in the power-off state, wherein the notifying unit provides the power-on enabled notification while the voltage of the battery is being raised by the charging unit and before the battery has reached a fully charged state.

2. The electronic device according to claim 1, further comprising an enabling unit operable to enable power-on when the voltage of the battery is equal to or greater than the first voltage threshold value.

3. The electronic device according to claim 1, further comprising a display unit comprising a screen and operable to display the power-on disabled notification on the screen.

4. A method for charging an electronic device, the method comprising:
   disabling power-on of the electronic device when a voltage of a battery of the electronic device is less than a first voltage threshold value;
   providing a power-on disabled notification indicating that the battery has not reached the first voltage threshold, if the power-on is disabled and if the battery is being charged when the electronic device is in a power-off state; and
   providing a power-on enabled notification, if the voltage of the battery is equal to or greater than the first voltage threshold value and if the battery is being charged in the power-off state, wherein the power-on enabled notification is provided while the voltage of the battery is being raised and before the battery has reached a fully charged state.

5. The method according to claim 4, further comprising enabling power-on of the electronic device when the voltage of the battery is equal to or greater than the first voltage threshold value.

6. The method according to claim 4, further comprising displaying on a display screen of the electronic device the power-on disabled notification.

7. A non-transitory computer-readable medium for an electronic device, the computer-readable medium storing computer-executable program code that when executed performs a method for charging an electronic device, the method comprising:
   disabling power-on of the electronic device when a voltage of a battery of the electronic device is less than a first voltage threshold value;
   providing a power-on disabled notification indicating that the battery has not reached the first voltage threshold, if the power-on is disabled and if the battery is being charged when the electronic device is in a power-off state; and
   providing a power-on enabled notification, if the voltage of the battery is equal to or greater than the first voltage threshold value and if the battery is being charged in the power-off state, wherein the power-on enabled notification is provided while the voltage of the battery is being raised and before the battery has reached a fully charged state.

8. The computer-readable medium according to claim 7, wherein the method further comprises enabling power-on of the electronic device when the voltage of the battery is equal to or greater than the first voltage threshold value.

9. The computer-readable medium according to claim 7, wherein the method further comprises displaying on a display screen of the electronic device the power-on disabled notification.

* * * * *